Jan. 9, 1968   F. CELORIO   3,362,130
PACKING MACHINE
Filed May 14, 1965   5 Sheets-Sheet 1

Inventor
FAUSTO CELORIO
By Mason, Fenwick & Lawrence
Attorneys

Inventor
FAUSTO CELORIO

Jan. 9, 1968  F. CELORIO  3,362,130
PACKING MACHINE
Filed May 14, 1965  5 Sheets-Sheet 5
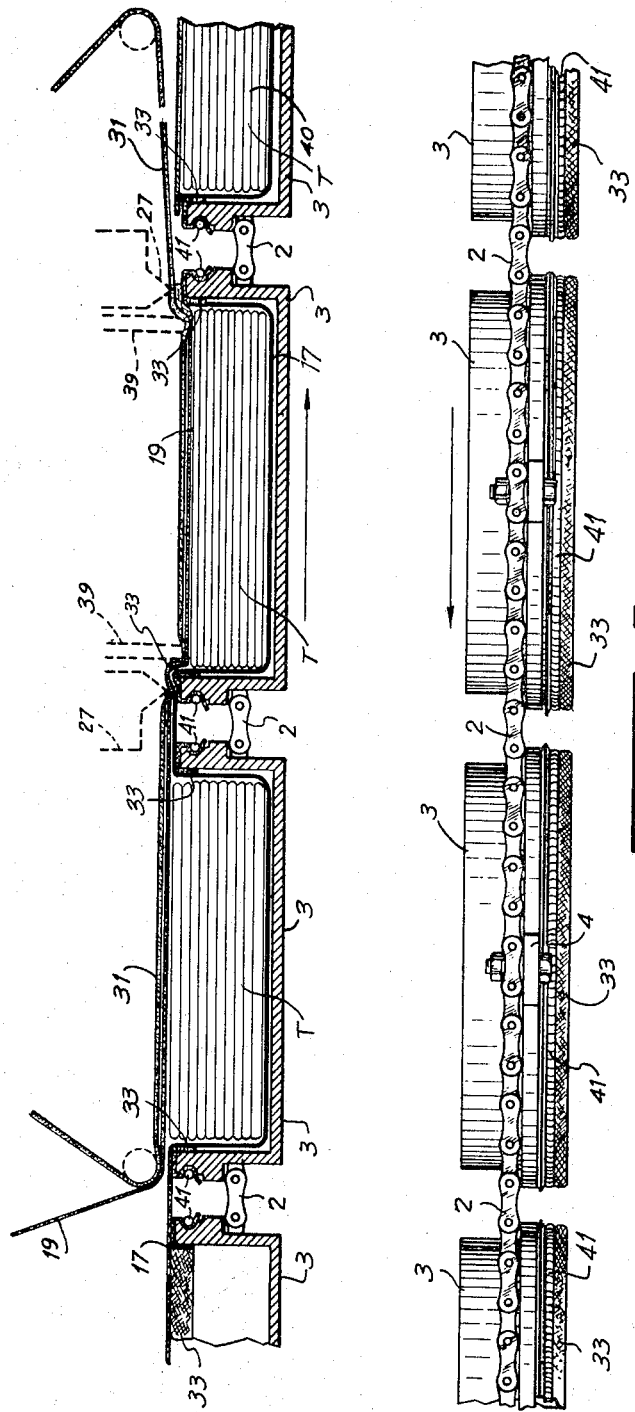
Inventor
FAUSTO CELORIO
By Mason, Fenwick & Lawrence
Attorneys

United States Patent Office 3,362,130
Patented Jan. 9, 1968

3,362,130
PACKING MACHINE
Fausto Celorio, Paseo Lomas Atlas 165, Lomas de
Chapultepec, Mexico City, Mexico
Filed May 14, 1965, Ser. No. 455,808
2 Claims. (Cl. 53—195)

ABSTRACT OF THE DISCLOSURE

A food packaging system employing a conveyor having a plurality of receptacles over which a first film of plastic is deposited to manually receive stacked food articles over each receptacle with a second film being fed into covering relation to the stacked food articles to be sealed by a sealing head comprising an inner pusher member for compressing the articles in each receptacle and an outer sealing and cutting member for sealing the thermoplastic film layers.

In the industry for producing food products, and particularly in the industry devoted to the mechanical and automatic preparation of Mexican tortillas, it has been a problem to sell these articles in bulk, inasmuch as this implies non-hygenical conditions, which under certain circumstances, could contaminate the food products, and therefore damage the health of the consumers.

Therefore, it is an object of the present invention to provide an improved apparatus for the packing of food materials, more particularly tortillas or cakes having a circular form, which will be of a very simple construction and highly efficient in its performance, without the human hands having to touch said food products for the packing.

Another object of the present invention is to provide a machine of the above mentioned character, which by means of a very simple operation will nest between a pair of plastic sheets, a plurality of food products, after which the sheets are sealed so that packs of receptacles are formed within which the food products are hygenically packed.

Another object of the present invention is to provide a machine of the above mentioned character, which comprises a plurality of vessels or receptacles having dimensions which are commensurate with the product to be packed, whereby the vessels may be conveyed by a suitable conveyor so that the operation will be rendered completely automatic.

Other and additional objects and advantages of the present invention will become apparent for anyone skilled in the art, while still others will explicitly appear as the present specification of a particularly preferred embodiment of the invention proceeds, taken in connection with the accompanying drawings, wherein:

FIGURE 6 is a side elevational view, partially broken away and fragmented, of a receptacle conveying chain, a portion of the advancing stretch, and a portion of the return stretch thereof being shown, together with part of the feeding mechanism of the present invention.

Figure 1:
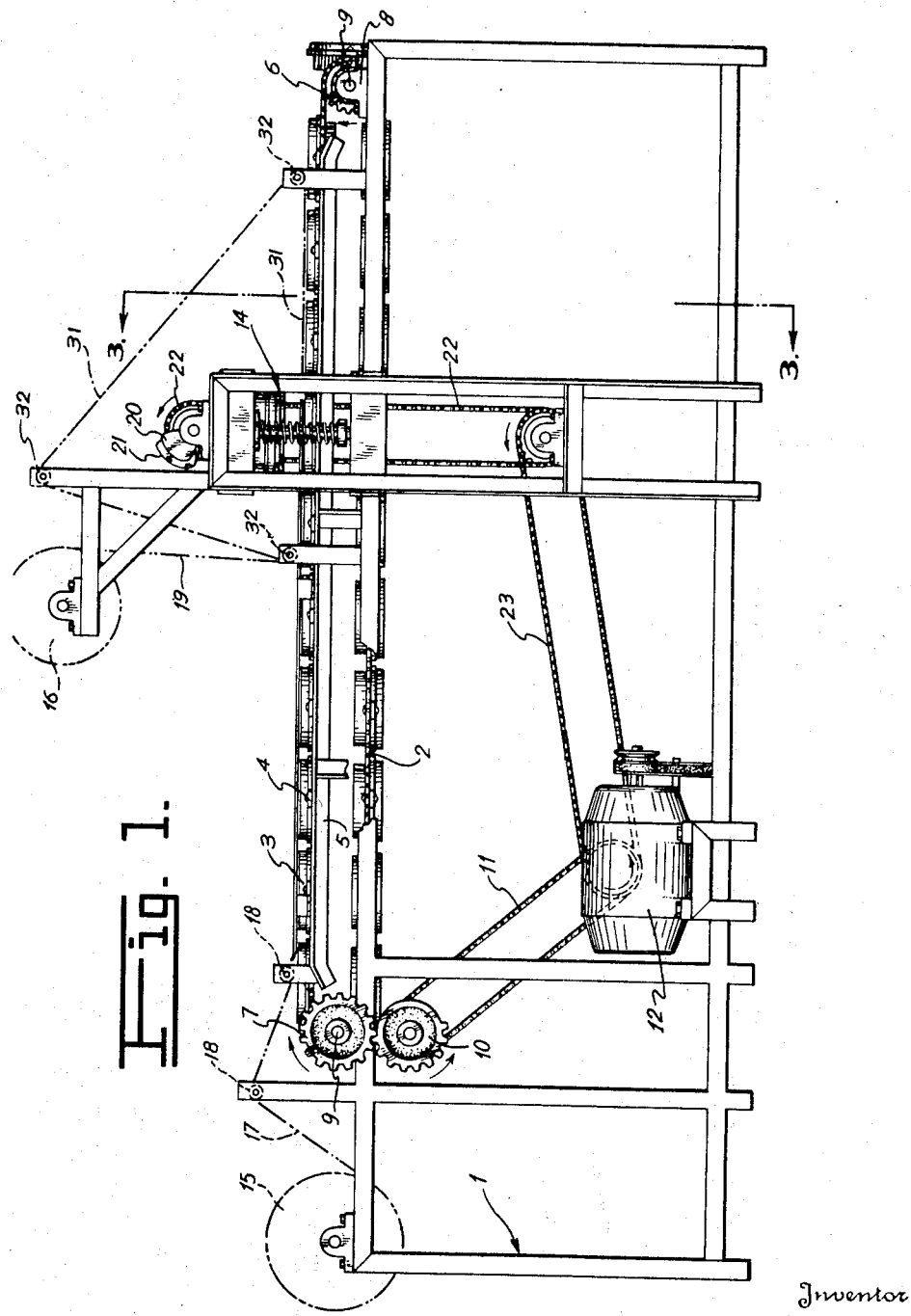
FIGURE 1 is a side elevational view, somewhat diagrammatic, of an improved packing machine built in accordance with the teachings of the present invention.
Figure 2:
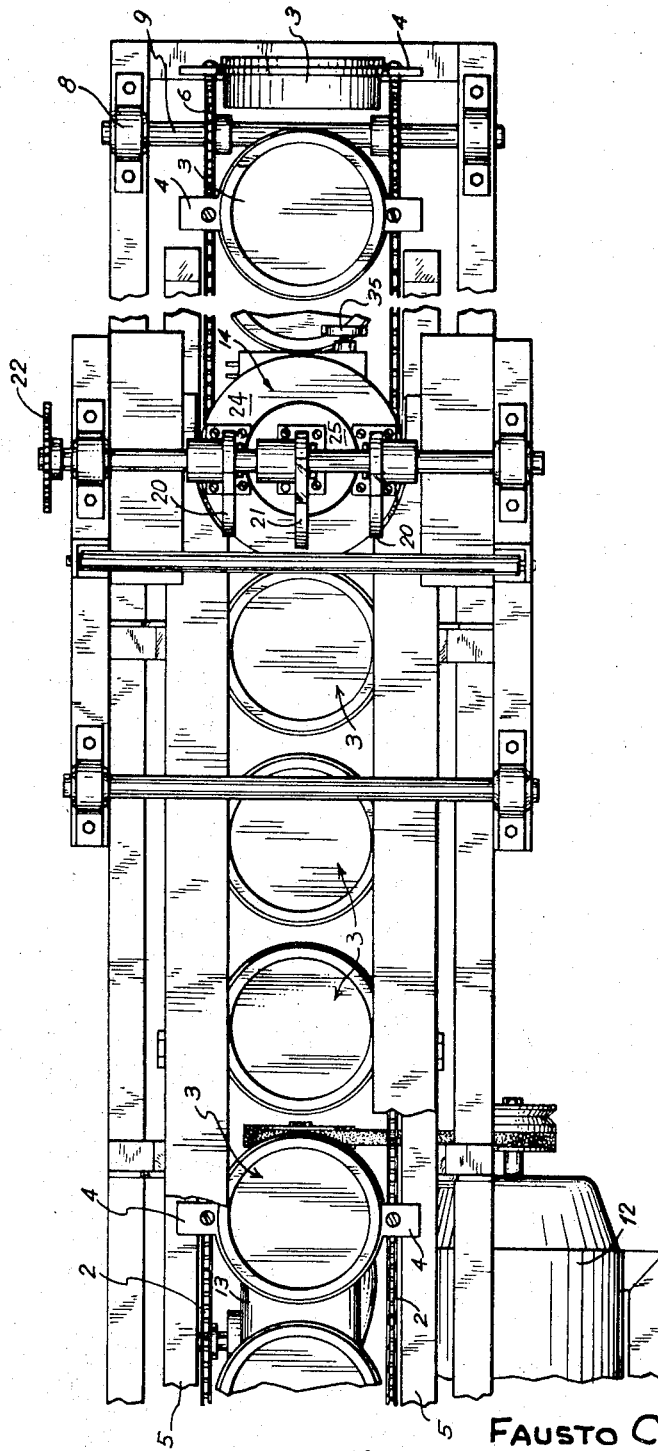
FIGURE 2 is a fragmentary top plan view of the portion of the packing machine illustrated in FIGURE 1, and particularly illustrates a cam shaft which is the activator of the sealing mechanism for the packages.

The drawings illustrate a preferred embodiment of the invention which is particularly adapted for packing tortillas or other similar food products. The preferred embodiment includes a frame 1, which by means of its upper members, supports a double conveyor chain 2, provided with a plurality of receptacles or vessels 3, in turn provided with wings 4 to slide along a guide track 5, which forms an integral part of frame 1, and threaded around a pair of sprockets or toothed wheels 6, journaled in corresponding journals 8, by means of suitable shafts 9 or their equivalent.

The idler sprockets supporting of the chain are designated by the reference character 6. On the driving side of the machine attached to the end of shaft 9, is a gear 7, which is the driving gear for the machine, meshed with a gear 10 which has teeth only on a section of its circumference for an object which will be more fully described herein below. The sprockets 6 are also supported by separate shafts 9. Gear 10 is driven by means of a chain and sprocket drive, indicated by means of reference character 11, which engages motor 12 through a speed reducing gear 13.

Gear 10 is provided with teeth only on a portion of its circumference, due to the fact that it must intermittently drive gear 7. The sealing apparatus, which is generally designated by reference number 14, works by steps, that is, it is an apparatus having a member which is lowered to contact the circumference on each one of the plates or receptacles 3 for a predetermined period of time, in order to achieve the heat sealing of the two films of plastic material according to the following description, whereby the chain 2 has to remain stationary when the plate reaches the suitable place to effect the above operation. Therefore, gear 7 is driven only by steps so that a portion of the periphery of gear 10 is left without teeth, in order to effect the driving through a suitable system to pass the receptacles 3 under the sealing apparatus 4 in steps and to allow the chain to remain stationary for a portion of the cycle in order to give time to the sealing apparatus 14 to effect its function.

The machine of the present invention is provided with a pair of reels 15 and 16, containing bands or belts of plastic material film such as polyethylene or other plastic material capable of being heat sealed at a relatively low temperature, in order to form the lower and upper layers of the packages which are to be prepared in accordance with the present invention.

Thus, reel 15 supplies a band 17 of plastic material which will be arranged by means of guiding rollers 18 over the open mouths of the receptacles 3. This is clearly illustrated at the left upper portion of FIGURE 6 of the drawings. A stack of articles T is then manually loaded onto band 17 above each receptacle 3; consequently, band 17 is depressed into each receptacle by its respective stack of articles. Reel 16 will supply a strip or band 19 which will be arranged over the articles to be packed, after the latter have been introduced within each one of the receptacles.

The sealing apparatus 14, is also a pushing apparatus, which pushes or biases the articles down to the bottom of receptacles 3 and places the film 19 of plastic material on the film 17, leaving therebetween the articles to be packed. The sealing apparatus 14 is controlled by means of a double cam 20 and a central single cam 21 driven by means of a chain and sprocket drive 22, which in turn is connected through the drive 23 with motor 12 from which the driving force is received.

At the zone or section corresponding to the sealing apparatus of the present invention, a continuous belt 31 of highly heat resistant plastic material, such as "Teflon," is arranged such that this belt will form a continuous layer over the receptacles and over the films 17 and 19 of polyethylene in order to serve as a cushion to effect the sealing operation. This avoids direct contact of knife 27 of the sealing device in a manner which will be described below so as to effect the arrangement as clearly illustrated in FIGURE 6.

Each receptacle 3 at its upper edge and all around its periphery is also provided with a covering of the same plastic material indicated by the reference character 33 in FIGURE 6 of the drawings, in order to perform the same above mentioned function, under the thermoplastic material film. If desired, the peripheral edge of the receptacles, can be provided with a ring of hard rubber which is not shown in the figures, and which can serve as an additional cushioning material for knife 27 of the sealing device of the present invention. However, the apparatus of the invention can perfectly work without this rubber ring and this ring has not been illustrated in the exemplary embodiment which is being described and which is illustrated in the accompanying drawings.

Figure 3:
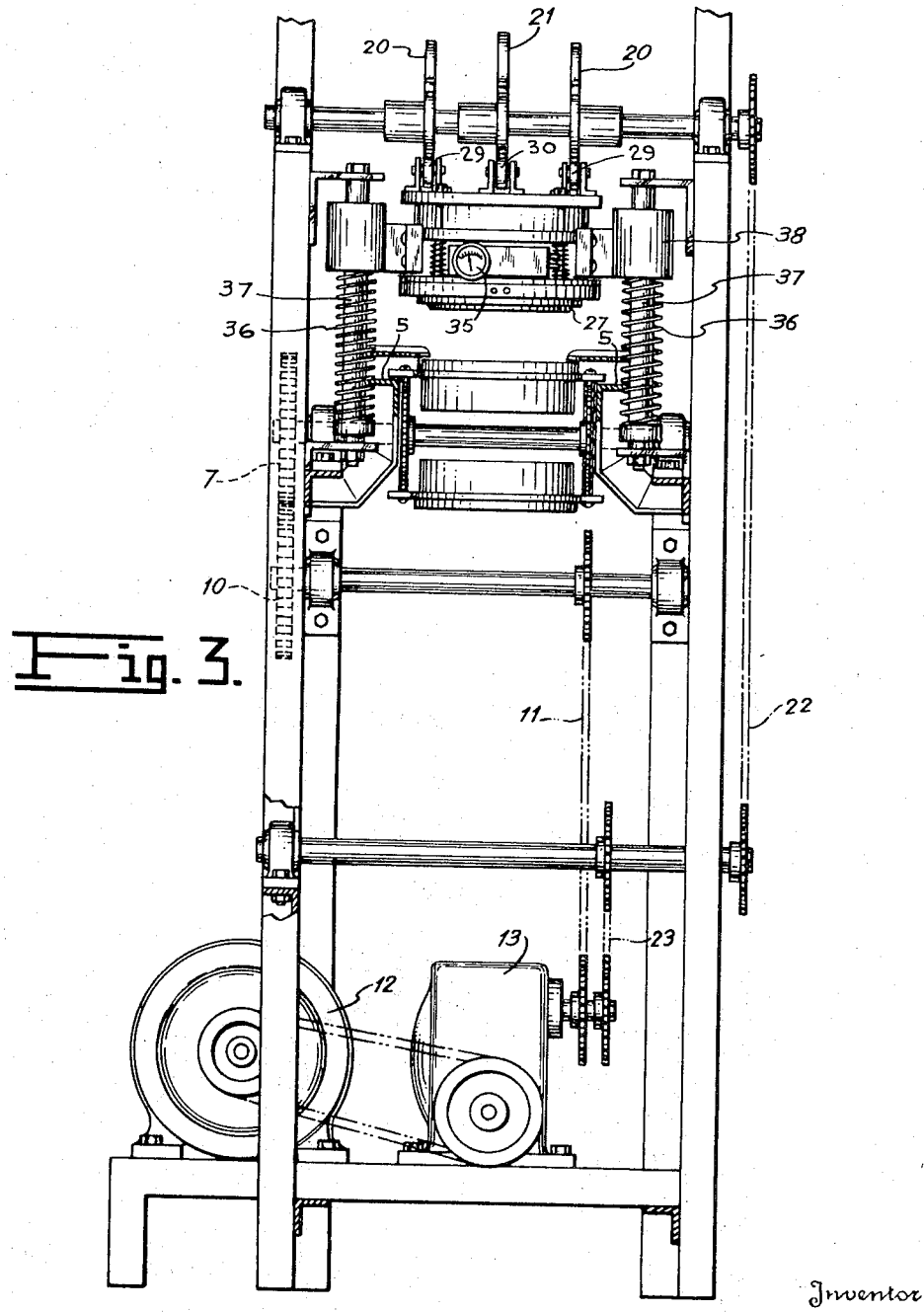
FIGURE 3 is a front elevational view of the packing machine in accordance with FIGURES 1 and 2, showing in fragmented manner the cam shafts and the conveying receptacles for the food products to be packed as well as the power system of the machine.
Figure 4:
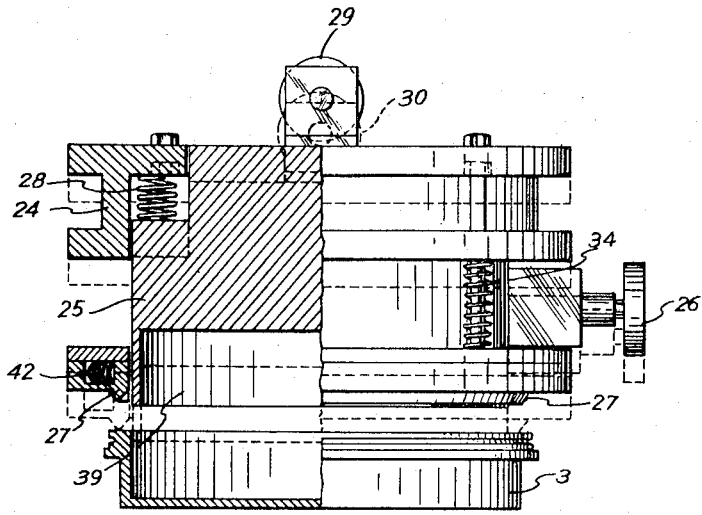
FIGURE 4 is an elevational view, partly broken away to show inner details, of the package sealing device of the present invention.
Figure 5:
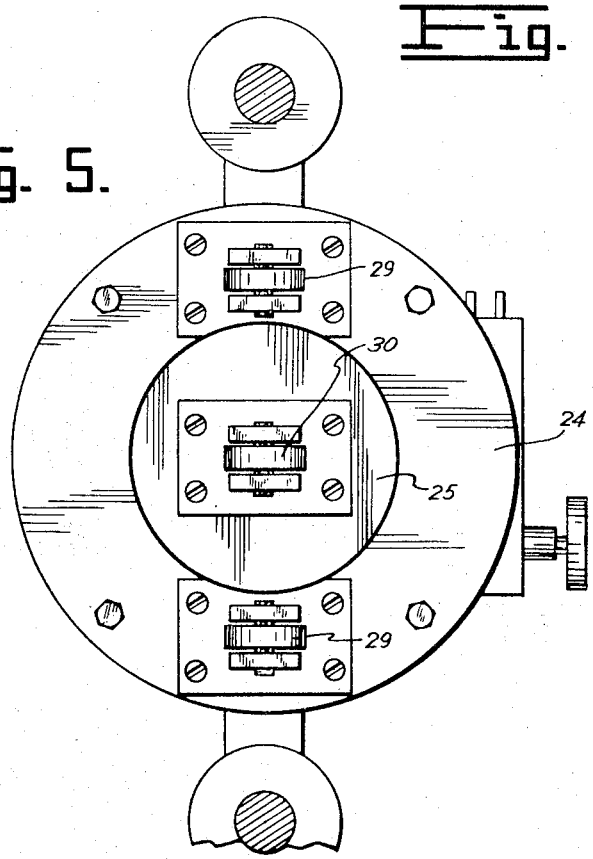
FIGURE 5 is a top plan view of the package sealing device illustrated in FIGURE 4.

The sealing device of the machine of the present invention, which is acted upon by means of cams 20 and 21 such as is clearly illustrated in FIGURE 3 of the drawings, comprises an outer hollow cylindrical body 24 and an inner cylindrical body 25 which are best illustrated in FIGS. 4 and 5. The inner body 25 is concentrically arranged within the body 24, and engaged therewith by means of a plurality of springs 28 in a manner such that it will have axial relative motion thereabout.

The above axial motion, as clearly shown in the dotted line position of FIGURE 4 of the drawings, has the objective of allowing inner body 25 to serve as a pusher for the articles and the polyethylene films which are to form the package, while the outer body 24 having at its lower edge a peripheral knife 27, will serve as a package sealer. This latter member is heated by means of heating device such as a suitable electrical resistor 42 which has its temperature controlled by conventional thermostat means.

The springs 34, are provided in order that the outer body 24 will return to its upper position after it has been freed by the cams 20 and 21 which bias it downwardly.

According to FIGURE 3 of the drawings, the sealing device of the present invention is also provided with a dial 35 to indicate the temperature thereof. After the sealing and cutting means of the device are pushed downwardly by means of the cams, it is upwardly drawn by means of springs 36 which are arranged within members 37 around which sleeves 38 which are supported by frame 1 are provided for supporting the whole sealing device of the present invention.

Cams 20 and 21 are are cyclically timed with respect to each other and are also cyclically timed with gears 7 and 10 driving the chain, so that when the sealing device is lowered, the chain is stationary since at this time the blank or non-toothed portion of gear 10 will be adjacent sprocket 7 and sprocket 7 will consequently not be rotated at this time. The receptacle stopped beneath the sealing devices contains a portion of films 17 and 19 which sandwichingly embrace the food articles T. Cam 21 then actuates wheel 30 to cause the sealing member 25 to be lowered to assume the dotted line position illustrated in FIG. 4. This action pushes the film 17 and compresses stack of food products T downwardly in receptacle 3 with the film 19 in an overlying relationship. Thereafter cams 20 push the wheels 29, which in turn push the outer body 24 of the sealing devcie in order to apply the knife 27, such as is clearly illustrated also by dotted lines in FIGURE 4. This effects the sealing operation and cutting or trimming of the plastic material sheets through the Teflon belts, as seen in FIGURE 6 of the drawings. In this latter figure, the complete assembly for the sealing device is shown comprising a peripheral layer of Teflon 33, the continuous Teflon belt 31, and the pair of strips 17 and 19 of polyethylene material film arranged between the Teflon belts and the knife 27 of the sealing device of the present invention. The entire sealing apparatus operates by the exertion of pressure on the wheel 30 which lowers member 25 to pack the receptacles 3 and then by lowering body 24 for sealing and cutting at the same time the films 17 and 19 of plastic material to finish the packing of the products as illustrated at 40 in FIGURE 6. When this happens, the pusher member 25 through its pusher portion 39, pushes all the assembly downwardly in order to position it and in order to effect the sealing operation by means of the knife 27 in the manner described.

Belt 31 of Teflon material, of course, is driven either manually or by means of the motion of the conveyor chain of the receptacles 3, so that it will always offer a changing surface for the sealing operation, and an even wear.

Once the packages have been sealed and cut, the latter are conveyed to the end of chain 2 to be received in a hopper or conveyor belt suitable for conveying them to the selling place.

As an ancillary feature of the present invention it is anticipated that the bottom of receptacle 3 can be made displaceable so as to modify the depth thereof, and therefore, its capacity. Of course the form or shape of the receptacles can be of any nature according to that of the product to be packed. In the embodiment illustrated in the above described drawings, the receptacles 3 have been illustrated as being cylindrical, inasmuch as they are particularly intended for the packing of Mexican tortillas.

Notwithstanding the above, it must be pointed out that the invention is not limited to the above described illustrative embodiments, and the form or shape of the receptacles can be of any nature thereby consequently changing the form of the sealing head and the knife 27, as well as the pushing device 39 of the sealing apparatus of the present invention.

The lining portions of Teflon material 33 can be fixed or fastened to the periphery of receptacles 3 by means of elastic or retaining rings 41 or by any other suitable means, provided that these covers of Teflon material will be rendered replaceable.

While the present invention has been described in terms of an illustrative embodiment thereof, it must be understood that the present invention must not be construed as limited to said embodiment, and that it can be susceptible to various changes and modifications within the true scope and spirit of the invention, which must only be restricted as per the recitation of the appended claims.

I claim:

1. An improved packing machine for introducing and sealing articles in receptacles comprising an endless chain formed by a plurality of receptacles arranged one after the other and joined together by connecting means, said chain being engaged by a pair of sprockets, the sprockets being on shafts, a first gear fastened to the shaft of one of said sprockets, a second gear meshed to said first gear, said second gear being provided with teeth only on part of the periphery thereof so as to drive at discrete intervals of time said first gear thereby providing a drive to the chain, the teeth-containing portion of said second gear being dimension such that each discrete driving interval of the chain will position a posterior receptacle in the area vacated by the movement of the adjacent anterior receptable, a continuous belt feeding device adapted to carry a thermoplastic material belt over the open mouths of said receptacles so that respective stacks of articles can be placed on said thermoplastic material belt over the respective open mouth of said receptacles to depress said thermoplastic material into each of said receptacles, a second continuous film belt feeding device arranged downstream of the place where the articles are introduced onto the thermoplastic material belt, said second belt feeding device overlaying in coextensive relation a second thermoplastic film belt relative to said first thermoplastic material film belt so that each stack of articles is sandwiched between both thermoplastic film belts, and a sealing device for the thermoplastic material film belts mounted for movement into contacting relationship with the second continuous film belt for sealing both thermoplastic material films, said sealing device comprising an outer cylindrical hollow body having at its lower portion a peripheral knife surface as a sealing element, thermostatically controlled heating means adjacent the knife to raise the temperature of said knife to a temperature suitable for effecting the sealing operation, and an inner cylindrical body concentric with the first outer cylindrical body having relative movement to said outer body, the inner body having upper and lower portions, and being provided with a pushing head at its lower portion, said outer and inner bodies being operatively controlled in movement by pushing cams, means to effect movement of both bodies at predetermined intervals on passage of the receptacles of the chain so that when a receptacle is located under said body, said bodies are pushed downwardly by said cams and the outer body seals and trims said thermoplastic material film belts as said inner body pushes the thermoplastic material film together with the articles sandwiched therebetween being compressed toward the bottom of the receptacle, thereby forming a package of suitable contour.

2. An improved packing machine according to claim 1, further characterized in that between the upper surface of the upper film of thermoplastic material and the pushing and sealing heads of said sealing device a continuous belt of highly heat resistant plastic material is positioned overlying the film belts of thermoplastic material and adapted for movement in the manner of an endless belt to always expose different portions of the surface thereof to the sealing head so that an enclosure is formed over said pair of thermoplastic films between the peripheral removable layer of high temperature resistant plastic material provided at the mouths of the receptacles and said endless belt of high temperature resistant plastic material.

References Cited

UNITED STATES PATENTS

| | | | |
|---|---|---|---|
| 2,879,635 | 3/1959 | Brock | 53—30 XR |
| 3,210,910 | 10/1965 | Seefluth | 53—39 XR |
| 3,239,993 | 3/1966 | Cherrin | 53—182 |
| 3,307,323 | 3/1967 | Fener | 53—180 |

GRANVILLE Y. CUSTER, JR., *Primary Examiner.*